UNITED STATES PATENT OFFICE 2,480,103

VITAMIN FOOD PRODUCT

Wilhelm Fux, Vienna, Austria

No Drawing. Application June 19, 1947, Serial No. 755,725. In Germany August 24, 1942

Section 1, Public Law 690, August 8, 1946
Patent expires August 24, 1962

8 Claims. (Cl. 99—11)

This invention relates to vitamin food for use in animal fodder, especially in connection with fodder containing calcium compounds.

Vitamin-containing fodder preparations containing calcium compounds are known. Considerable difficulties arise in their production, however, since the usually oily vitamin preparations, for example fish-liver oil containing vitamin A, vitamin D or E in an oil solution, are not adsorbed by the mineral basic substances of the fodder admixtures, such as calcium carbonate. It has therefore been suggested to saturate adsorbent vegetable substances with these oils or oily solutions and thereafter to mix the added vegetable substances with the mineral salts. Since the vitamins, particularly vitamin D, are easily oxidized and damaged by atmospheric oxygen and by the metal salts of higher stages of oxidation which act as oxidizing agents and which are frequently contained in the fodder lime (for instance trivalent iron, i. e. ferric compounds) or are added to the latter in the form of salts, such as manganese or copper salts, the problem arises of protecting the vitamins added to the fodder lime from oxidation or from the action of such salts, in order to obtain preparations having good storage properties and full vitamin action. Vitamin food products consisting of a vitamin containing substance in massed units, the individual units being coated with a film of soluble air-excluding material particularly an edible gum or resins such as karaya gum have already been described. However the coatings heretofore used are not fully able to solve the problems, referred to above, especially when the units would have to be incorporated with fodder containing calcium compounds. Gums and resins do not offer a complete sealing of the cloven vitamin containing granules and moreover such coatings during prolonged storage are easily damaged by moisture and bacterial attack. Besides, coatings consisting of gums or resins show some stickiness, resulting in a conglomeration of the loosely connected mass of the granules, whereby the dosage is made difficult and a homogeneous distribution with other ingredients of fodder preparations is prevented.

The present invention removes these well known disadvantages.

It is an object of this invention to provide vitamin containing granules, especially adapted for incorporation with mineral basic substances, said granules being coated with a sealing substance of great durability, so that it may be stored for a protracted period without damage. Another object of the invention is to provide vitamin containing granules, the vitamin content thereof being protected by a nonsticky coating.

Another object of the invention is to provide vitamin containing granules which are not subject to bacterial attack even under conditions of humidity. Another object of the invention is to provide a method of producing vitamin containing granules protected against oxidation by air and oxidation by contaminations of lime or other mineral constituents of fodder preparations, and this in a simple and effective manner. Other objects will be apparent as the description proceeds.

According to this invention a vitamin food product is obtained which comprises granules of vitamin containing adsorbents particularly oil-soluble vitamins e. g. vitamin D containing adsorbents, such granules being coated with a dry protective layer of water soluble alkyl cellulose, preferably of methyl cellulose.

One method of producing my improved vitamin food is for example as follows:

A finely ground neutral absorbent powder, for example of vegetable substances, animal charcoal, or the like, is carefully saturated with the oily solution of the desired vitamin. This oil-saturated powder is then well kneaded with an aqueous solution of methyl cellulose and the mass is granulated, i. e. divided into small grains, by the usual methods. On completion of the granulation, the grains are dried and the resulting granulated final product (granulate) is then, for example, added to fodder and calcium compounds in the required amount. The individual more or less hard grains or granules, prepared as above described, are each covered by a film or coating of the dried methyl cellulose as a smooth and uniform protective coating, which adequately insulates the vitamin contained in the granules against all disturbing influences that may arise.

Small amounts of substances which are adapted to increase the wetting action of the solution are conveniently also added to the alkyl cellulose solution which is used to produce the coating layer and which constitutes a viscous, slimy mass. Such added substances may be soluble salts of bivalent or polyvalent acids, for example sodium carbonate, sodium phosphate, or preferably waterglass (sodium silicate). This latter compound has the property of not only increasing the wetting properties of the alkyl cellulose solution to a particularly high degree, but also of serving at the same time to harden the coating layers, which effect is probably due to a gradual separation of silicic acid.

In comparison with the proposals of the prior art, the use of alkyl celluloses for the protection of vitamins in accordance with the present invention affords particular advantages. The solutions of alkyl cellulose, particularly methyl cellulose, above all when waterglass is used at the same time, are capable of forming far more even, smoother, and harder coatings than gum and other slimy drugs; completely secure sealing of all pores of the per se divided basic mass of the granulate is also thereby brought about. A feature of the coating substances to be employed in accordance with the invention, which is of particular importance for fodder lime preparations, consists in that the alkyl celluloses are bacteria-proof, and therefore the danger of destruction of the protective layer by bacterial action, and hence of damage to the vitamins, during storage is averted, even on storage under damp conditions (which is frequently unavoidable in the case of fodder lime preparations).

*Example*

1 kg. of herb powder is kneaded with 200 ccm. of an oily solution of vitamin D containing 100,000 international units per ccm. and then saturated with 700 grams of an aqueous methyl cellulose solution of 5% to which 50 grams of a 30% waterglass solution has been added, and the mixture is granulated and dried at a low temperature, preferably not exceeding 50° C. 1250 grams of a granulate containing 16000 international units of vitamin D per gram is obtained. 5 grams of this granulate is used for 995 grams of feed lime with other admixtures, to obtain a fodder lime preparation containing 80,000 international units per kg.

What I claim is:

1. A vitamin food product, comprising granules, which granules consist of adsorbent material carrying vitamins, said granules being coated with a dry layer of alkyl-cellulose.

2. A vitamin food product, comprising granules, consisting of adsorbents, incorporated with vitamins, said granules being coated with a dry layer of methyl-cellulose.

3. A vitamin food product, comprising granules, consisting of adsorbents, incorporated with vitamins, said granules being coated with a dry layer of methyl cellulose, said coated granules being homogenously incorporated with fodder containing non-toxic calcium compounds.

4. A process for producing vitamin containing food products, comprising impregnating adsorbent material with a solution of vitamins to be incorporated therewith, mixing the impregnated adsorbents with a dilute aqueous solution of water soluble alkyl cellulose to form a semifluid mass, granulating the mass thus obtained and drying the granules.

5. A process for producing vitamin containing food products, comprising impregnating adsorbents with a solution of vitamins to be incorporated therewith, mixing the impregnated adsorbents with a dilute aqueous solution of water-soluble methyl-cellulose to form a semifluid mass, granulating the mass thus obtained and drying the granules.

6. A process for producing vitamin containing food products comprising impregnating adsorbents with a solution of vitamins to be incorporated therewith, mixing the impregnated adsorbents with a dilute aqueous solution of water soluble alkyl cellulose to form a semifluid mass the said aqueous solution containing wetting agents, granulating the mass thus obtained and drying the granules.

7. A process for producing vitamin containing food products, comprising impregnating adsorbents with a solution of vitamins to be incorporated therewith, mixing the impregnated adsorbents with a dilute aqueous solution of water soluble methyl cellulose to form a semifluid mass the said aqueous solution containing water glass, granulating the mass thus obtained and drying the granules.

8. A process for producing vitamin containing food products, comprising impregnating a ground mass of dried vegetable animal fodder with an oily solution of an oil soluble vitamin, mixing the impregnated mass with a dilute aqueous solution of water-soluble methyl-cellulose to form a semifluid mass, said solution containing a small amount of water glass, granulating the mass thus obtained and drying the granules.

WILHELM FUX.

REFERENCES CITED

The following references are of record in the file of this patent:

UNITED STATES PATENTS

| Number | Name | Date |
|---|---|---|
| 1,633,711 | Prince | June 28, 1927 |
| 1,764,085 | Placak | June 17, 1930 |

OTHER REFERENCES

"Water-Soluble Cellulose Ethers," by L. H. Bock, Industrial and Engineering Chemistry, vol. 29, No. 9, Sept. 1937, pages 985 to 987.